DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 28, 1970

876 O.G. 816

T876,009

PHOTOGRAPHIC ELEMENT AND PROCESS UTILIZING A DYE AND AN AROMATIC DIAZONIUM SALT

Frederick J. Rauner, Kodak Park Works, Rochester, N.Y. 14650

Filed Jan. 28, 1970, Ser. No. 6,544
**Int. Cl. G03c *1/52***
U.S. Cl. 96—91
No Drawing. 12 Pages Specification

α-Methylpyrylium salts, e.g., 2,4,6-trimethylpyrylium perchlorate, can be employed as diazo couplers in light-sensitive diazosulfonate printout systems.